(No Model.)
M. HOWLAND.
SNOW SHOVEL.
No. 288,812. Patented Nov. 20, 1883.
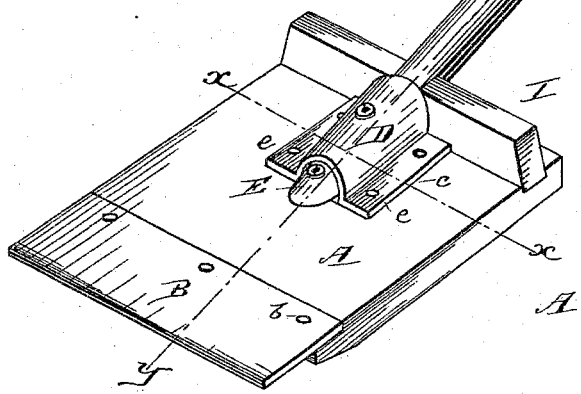
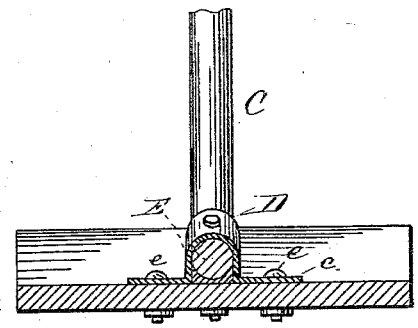
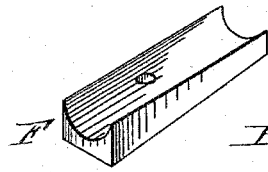
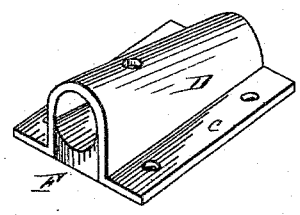
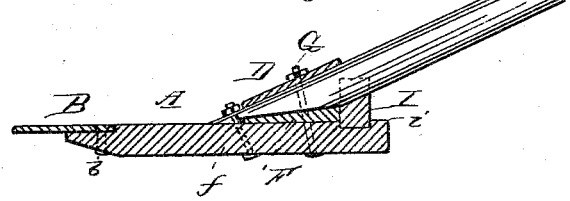
Witnesses:
E. W. Johnson
H. H. Taylor
Inventor
M. Howland
Attorney.

UNITED STATES PATENT OFFICE.

MARK HOWLAND, OF WATERBURY, CONNECTICUT.

SNOW-SHOVEL.

SPECIFICATION forming part of Letters Patent No. 288,812, dated November 20, 1883.

Application filed May 24, 1882. (No model.)

*To all whom it may concern:*

Be it known that I, MARK HOWLAND, a citizen of the United States, residing at Waterbury, in the county of New Haven and State of Connecticut, have invented a new and useful Improvement in Snow-Shovels, of which the following is a specification.

My invention relates to snow-shovels; and it consists in the improved construction, fully described hereinafter, whereby implements of the character to which my improvement appertains are rendered durable and simple in construction and less cumbersome than heretofore.

In the accompanying drawings, Figure 1 is a snow-shovel constructed in accordance with my invention. Fig. 2 is a transverse section on the line $x\,x$ of Fig. 1. Fig. 3 is a longitudinal section on the line $y\,y$ of Fig. 1, and Figs. 4 and 5 are detailed views.

A represents the body proper of the shovel, of one piece, preferably of wood, and cut away at its front upper face to form a depression, in which rests the rear edge of a metallic plate, B, which is bolted to the shovel A by bolts $b$, the upper face of the plate being flush with the upper face of the shovel.

The handle C is attached to the shovel A by means of a metallic socket, D, provided with lateral flanges $c$, which bear upon the upper face of the shovel A, perforations $d$ in the said flanges permitting the passage of securing-bolts $e$ for the attachment to the shovel.

The recessed portion of the socket D is inclined, as shown in Figs. 1 and 3, so that it is contracted at its forward end, and the end E of the shovel is beveled to rest within said socket and admit of the proper inclination of the handle with respect to the shovel.

A portion of the beveled end E of the handle is cut away to form a lip, $f$, and a recess, $g$, within which lies snugly a wedge-block, F, concave on its upper face, to accommodate the convex under side of the handle, and inclined toward the front of the shovel, as shown in Figs. 3 and 4. The lip $f$, formed on the end E of the shovel-handle C, prevents the withdrawal of the said handle from the recess of the socket-plate D until the said socket-plate is detached from the shovel. The wedge-block also contracts the diameter of the recess in the socket-plate sufficiently to insure the snug fitting of the handle end E therein.

A bolt, G, passing through the shovel, the wedge-block, the handle end, and the socket portion of the plate D, receives a nut, $g$, on its upper threaded end, and affords an additional security against the accidental detachment of the parts. A like bolt, H, also passes through the lip $f$ of the handle end, and through the shovel A, for a like purpose.

The shovel-handle bears in a recess formed in a transverse block, I, located at the rear of the socket-plate D, and resting in a groove, $i$, formed in the rear upper face of the shovel. The plate B, bolted to the front edge, serves as a guard-plate or lip for the front edge of the shovel, and prevents the splintering of the same.

From the foregoing description it will be apparent that a shovel constructed in accordance with my invention is of simple and durable construction, the parts being few, and the general implement devoid of unnecessary parts and weight.

I claim—

1. In a snow-shovel, a socket-plate bolted to the upper face of the shovel-body, and having a recess adapted to receive the end of a handle recessed on its under side to receive a key-wedge for preventing the longitudinal withdrawal of said handle, substantially as set forth.

2. The combination, in a snow-shovel, of a socket-plate, D, having flanges $c$, perforated for attachment of said plate D to the shovel-body, a handle having its end beveled for insertion in the contracted recess of the socket-plate, and having a lip, $f$, bearing against a key-wedge interposed between the handle and the shovel-body, and a transverse block, I, recessed to form a bearing for the handle at the rear of the plate D, substantially as set forth.

MARK HOWLAND.

Witnesses:
S. BOOTH,
C. V. HALL.